(12) United States Patent
Kuemin

(10) Patent No.: US 6,350,395 B1
(45) Date of Patent: Feb. 26, 2002

(54) STABILIZER COMPOSITION

(75) Inventor: Marius Kuemin, Huenenberg (CH)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/581,735

(22) PCT Filed: Dec. 17, 1998

(86) PCT No.: PCT/US98/26815

§ 371 Date: Jun. 16, 2000

§ 102(e) Date: Jun. 16, 2000

(87) PCT Pub. No.: WO99/31031

PCT Pub. Date: Jun. 24, 1999

(30) Foreign Application Priority Data

Dec. 18, 1997 (GB) .............................................. 9726874

(51) Int. Cl.[7] ........................ C09K 15/16; C09K 15/20; C07C 17/42; C07C 21/12
(52) U.S. Cl. ........................ 252/401; 252/405; 252/407; 252/390; 252/394; 252/396; 510/265; 510/266; 510/273; 570/109; 570/110; 570/111; 570/114; 570/121
(58) Field of Search ................................. 252/401, 405, 252/407, 390, 394, 396; 570/109, 110, 111, 114, 121; 510/265, 266, 273, 412

(56) References Cited

U.S. PATENT DOCUMENTS

| | | | |
|---|---|---|---|
| 3,839,087 A | * 10/1974 | Beckers | 252/392 |
| 4,034,251 A | 7/1977 | Dempf et al. | |
| 4,217,310 A | 8/1980 | Cormany | |
| 4,220,607 A | * 9/1980 | Dempf et al. | |
| 4,287,003 A | * 9/1981 | Allen | 134/31 |
| 4,368,338 A | * 1/1983 | Ishibe et al. | 570/109 |
| 4,404,412 A | * 9/1983 | Ishibe et al. | 570/109 |
| 4,416,797 A | * 11/1983 | Minagawa et al. | 252/401 |
| 4,942,267 A | 7/1990 | Roark et al. | |

FOREIGN PATENT DOCUMENTS

| | | | |
|---|---|---|---|
| DD | 111 198 | 2/1975 | |
| DE | 24 49 667 | 4/1976 | ........... C07C/17/42 |
| DE | 28 11 779 | 9/1979 | ........... C07C/17/42 |
| DE | 32 46 886 | 6/1984 | ........... C07C/17/42 |
| DE | 33 46 530 | 7/1985 | ........... C07C/17/42 |
| DE | 39 22 135 | 1/1991 | ........... C07C/17/42 |
| GB | 2 069 995 | 9/1981 | ............. C07C/7/20 |

OTHER PUBLICATIONS

Textilreinigung May 1970—Problematik und Möglichkeiten zur Stabilisierung von Tri–und Tetrachloräthylen—Dipl.–Chem. Rainier Teichmann, Forchungsinstitut für Textiltechnologie, Karl–Marx–Stadt.

* cited by examiner

Primary Examiner—Joseph D. Anthony

(57) ABSTRACT

A stabilizer composition comprising a) an N-alkyl morpholine and b) a straight-chain or cyclic aliphatic amine containing no hetroatoms other than N with a boiling point of at least 150° C. The stabilizer composition is useful for stabilizing a halogenated hydrocarbon against degradation.

20 Claims, 1 Drawing Sheet

STABILIZER COMPOSITION

Figure 1:
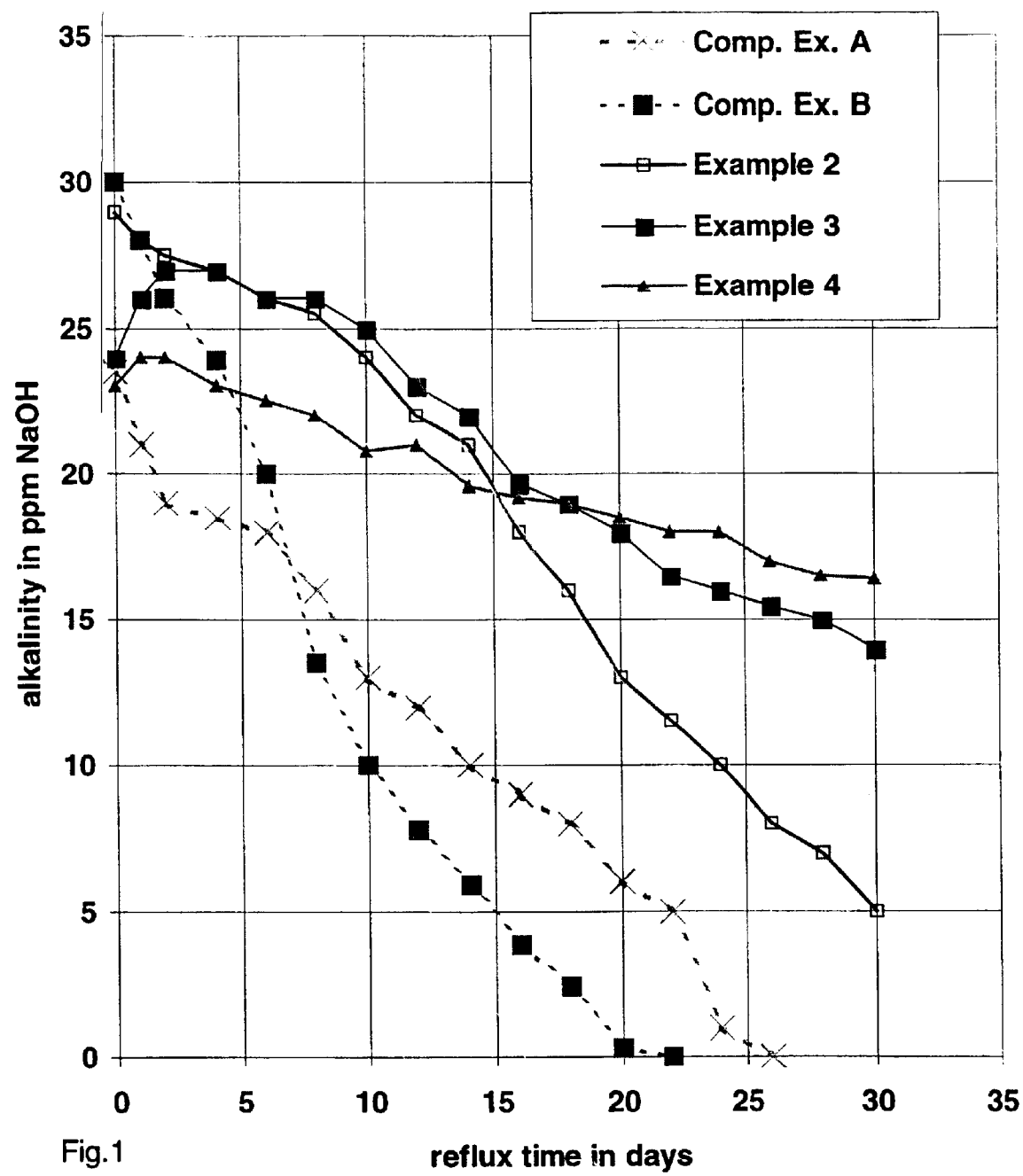

The present invention concerns a stabilizer composition, particularly a stabilizer composition for halogenated hydrocarbons, such as perchloroethylene.

Halogenated hydrocarbons containing 1 to 3 carbon atoms, such as perchloroethylene, are used in several applications, such as dry-cleaning of textiles or degreasing of metals. However, it is well known that trichloroethylene or perchloroethylene tends to decompose when they are exposed to heat, oxygen, light or water, particularly if metals or metal salts are present. Mainly acidic products, such as hydrochloric acid, are produced during decomposition.

Therefore, it is common in the industry to add a stabilizer to halogenated hydrocarbons containing 1 to 3 carbon atoms, such as perchloroethylene.

German Offenlegungsschrift DE-A-24 49 667 (equivalent to U.S. Pat. No. 4,034,051) discloses that perchloroethylene is stabilized by the addition of 0.001 to 0.01 weight percent of an N-alkyl morpholine and 0.001 to 0.01 weight percent of an alkyl phenol.

German Offenlegungsschrift DE-A-32 46 886 relates to a process for stabilizing perchloroethylene wherein 1,2-epoxycyclooctane and/or 1,2-5,6-diepoxycyclooctane in addition to known epoxides, such as cyclohexene oxide, are added to perchloroethylene as stabilizers. Additionally amines, preferably triethylamine, diisopropylamine, dimethylisobutylamine, sec.-butylamine, pentylamine, isopentylamine, 5-methyl-2-hexane-amine, diisobutylamine, N-methylpyrrole or N-methyl morpholine can be used as stabilizers. Other stabilizers are ethers, such as dialkyl ethers, olefins, such as diisobutylene, or alkyl phenols, such as p-cresol.

German Offenlegungsschrift DE-A-39 22 135 relates to the use of cyclopentene oxide for stabilizing perchloroethylene. The same amines as in German Offenlegungsschrift DE-A-32 46 886 and alkyl phenols, such as p-cresol, o-cresol or p-tert.-butyl phenol are mentioned as additional stabilizers. A stabilizer mixture containing cyclopentene oxide, N-alkyl morpholine, diisopropylamine and alkyl phenol is said to be preferred.

German Offenlegungsschrift DE-A-28 11 779 relates to stabilized perchloroethylene which contains 0.001 to 0.01 weight percent of alkyl phenols, 0.0005 to 0.002 weight percent of diisopropylamine and 0.05 to 0.5 weight percent of cyclohexene oxide. DE-A-28 11 779 discloses that strong corrosion is observed with a stabilizer composition comprising aniline, N-methylmorpoline, p-tert.-butylphenol and cyclohexene oxide.

U.S. Pat. No. 3,424,805 suggests stabilization of chlorinated hydrocarbons by addition of an aliphatic diamine or polyamine. It is taught that the stabilizing effect can be increased by the addition of an aliphatic monoamine, such as diisopropylamine or pyrrole or N-alkyl pyrrole, such as N-methyl pyrrole. Unfortunately, the suggested amine combinations often do not provide satisfactory results for stabilizing perchloroethylene.

U.S. Pat. No. 4,942,267 discloses a stabilizer composition for perchloroethylene which comprises a cyclic alkyl amine, an alcohol of 3 to 7 carbon atoms and an olefin component. It mentions that the stabilizer composition may be combined with an aliphatic or aromatic amine, nitrogen containing materials, such as pyrroles, cyclic ethers and aromatic compounds containing a phenol group.

East German Patent 111 198 discloses a mixture of 20 to 160 g of thymol, 20 to 150 mL of triethanolamine, 20 to 150 mL of morpholine and 0 to 55 mL of triethylamine as a stabilizer per 1000 L of perchloroethylene. A mixture of 50 g of thymol, 45 mL of triethylamine, 30 mL of morpholine and 345 mL of trichloroethylene is suggested for stabilizing 1000 L of trichloroethylene. Unfortunately, when perchloroethylene or trichloroethylene containing triethanolamine as a stabilizer is used for degreasing non-ferrous heavy metals, such as copper, aluminum or brass, spots are left on the metals.

UK Patent Application GB 2 069 995 discloses a stabilizer for dichloromethane which contains methyl alcohol and small amounts of diisopropylamine and/or benzylethylamine and/or triethylamine.

Unfortunately, perchloroethylene which has been stabilized as suggested in the prior art above does not meet the requirements of the industry for many applications. Often the capacity of the stabilizer is reduced over time which is made apparent by a decrease of alkalinity of the stabilized perchloroethylene.

A new stabilizer composition has been found which is very effective for stabilizing halogenated hydrocarbons against decrease of alkalinity.

Accordingly, one aspect of the present invention is a stabilizer composition which comprises
  a) an N-alkyl morpholine and
  b) a straight-chain or cyclic aliphatic amine containing no heteroatoms other than N with a boiling point of at least 150° C.

Another aspect of the present invention is a stabilized halogenated hydrocarbon which comprises this stabilizer composition.

Yet another aspect of the present invention is a method of stabilizing a halogenated hydrocarbon against degradation by adding an effective amount of this stabilizer composition.

Yet another aspect of the present invention is the use as stabilizer for a halogenated hydrocarbon of a) an N-alkyl morpholine and b) a straight-chain or cyclic aliphatic amine containing no heteroatoms other than N with a boiling point of at least 150° C.

The accompanying FIG. 1 illustrates the decrease of alkalinity of various perchloroethylenes stabilized according to the present invention and according to the prior art during distillation and recycling of the distillate over an extended period of time.

The stabilizer composition of the present invention preferably comprises
  a) from 20 to 99, more preferably from 50 to 95, most preferably from 60 to 90 percent of an N-alkyl morpholine and
  b) from 1 to 80, more preferably from 5 to 50, most preferably from 10 to 40 percent of a straight-chain or cyclic aliphatic amine containing no heteroatoms other than N with a boiling point of at least 150° C., based on the total weight of a) and b).

The alkyl group in the N-alkyl morpholine is preferably a straight-chain or branched alkyl group of from 1 to 6, more preferably 1 to 4, most preferably 1 to 3 carbon atoms, such as methyl, ethyl, n-propyl or isopropyl. The ethyl group and particularly the methyl group are preferred. The ring carbon atoms in the N-alkyl morpholines can be substituted, for example with alkyl groups of from 1 to 4 carbon atoms, preferably methyl. N-ethyl morpholine or, more preferably, N-methyl morpholine is the most preferred compound a) of the stabilizer composition of the present invention. The stabilizer composition of the present invention contains one or more N-alkyl morpholines.

The amine b) in the stabilizer composition of the present invention has a boiling point of at least 150° C., more preferably at least 160° C., most preferably at least 180° C., measured at atmospheric pressure. The amine b) contains no heteroatoms other than N. The amine can be a primary, secondary or tertiary straight-chain or cyclic aliphatic amine. Preferably, the amine is saturated. Secondary and tertiary amines are preferred. Mono-, di- or triamines are useful, provided that they have an above-mentioned boiling point. More preferably, the amine b) contains two or more amino groups. Preferably, the pKa of the amine b) is from 7.5 to 11, more preferably from 8 to 9.5. Particularly preferred amines are those with two amino groups of which the first pKa value is above 11 and the second pKa is from 7.5 to 11.

Preferred amines b) are 1-aminoheptane, n-octyl amine, tert.-octyl amine, tetramethylene diamine, hexamethylene diamine, 1,8-octane diamine, 4-aminomethyl-1,8-octane diamine, hexamethylene tetraamine, 1,4-diazabicyclo[2.2.2] octane, 1,3,5-triethylhexahydro-1,3,5-triazine or N,N,N',N', N"-pentamethyldiethylene-triamine. Of these amines 1,4-diazabicyclo[2.2.2]octane, 1,3,5-triethylhexahydro-1,3,5-triazine, N,N,N',N',N"-pentamethyldiethylene-triamine and 4-aminomethyl-1,8-octane diamine are the most preferred ones.

The stabilizer composition of the present invention contains one or more the above-mentioned amines b).

The stabilizer composition of the present invention optionally contains an antioxidant, such as an alkyl phenol, preferably an o- and/or p-alkyl phenol which contains one or more straight-chain or branched alkyl chains containing from 1 to 18, preferably from 2 to 8 carbon atoms, such as p-cresol, o-cresol, 2,6-dimethyl-phenol or 2,4,6-trimethylphenol. Preferred are p-alkyl phenols which contain a branched $C_{3-5}$-alkyl chain, such as p-isopropyl-phenol, p-tert.-butyl phenol, 2,4-di-tert.-butyl phenol or amyl-phenol. One or more antioxidants can be comprised in the stabilizer composition. If the stabilizer composition of the present invention contains one or more antioxidants, the weight ratio between the total amount of the antioxidant(s) and the total amount of the amines a) and b) is preferably from 0.05 to 2.0:1, more preferably from 0.1 to 1.0:1, most preferably from 0.2 to 0.8:1.

A further optional component of the stabilizer composition of the present invention is an ether, preferably a dialkyl ether, such as dibutyl ether or di-sec.-butyl ether; a dialkoxymethane, such as dimethoxy methane or diethoxy methane; a glycol dialkyl ether, such as dimethoxy ethane, diethoxy ethane or butylglycol-tert.-butyl ether, a polyglycol ether, such as diglycol-tert.-butyl ether, methoxy-diglycol-tert.-butyl ether or triglycoldimethyl ether; an aryl ether, such as diphenyl ether; an aralkyl ether, such as ether, an arylalkyl ether, such as anisol; or a hydroquinone dimethyl ether. One or more ethers can be comprised in the stabilizer composition. If the stabilizer composition of the present invention contains one or more ethers, the weight ratio between the total amount of the ethers and the total amount of the amines a) and b) is preferably from 0.02 to 1.0:1, more preferably from 0.05 to 0.5:1, most preferably from 0.08 to 0.4:1.

The components of the stabilizer composition of the present invention can be added individually or as a mixture to a halogenated hydrocarbon. However, according to a preferred embodiment of the present invention, a stabilizer composition is produced in the form of a concentrate, wherein the amines a) and b) and optional stabilizer components, such as antioxidant(s) and/or ether(s), are dissolved in an organic solvent, preferably a hydrocarbon or a chlorinated hydrocarbon. The organic solvent preferably has a boiling point above 160° C., measured at atmospheric pressure. Preferred hydrocarbons are isoparaffins with a boiling point above 200° C. If a chlorinated hydrocarbon is used as a solvent, it has preferably about the same boiling point as the halogenated hydrocarbon to be stabilized.

The term "organic solvent" as used herein includes one or more types of organic liquids. The amount of the organic solvent is preferably from 5 to 95 percent, more preferably from 20 to 90 percent, most preferably from 60 to 80 percent, based on the total weight of the concentrate.

The concentrate preferably comprises from 2 to 50 percent, more preferably from 5 to 30 percent, most preferably from 8 to 15 percent of one or more N-alkyl morpholines a), preferably from 1 to 50 percent, more preferably from 2 to 20 percent, most preferably from 5 to 10 percent of one or more amines b), preferably from 2 to 20 percent, more preferably from 5 to 15 percent of one or more optional antioxidants, and preferably from 0 to 20 percent, more preferably from 1 to 15 percent of one or more optional ethers, based on the total weight of the concentrate.

The stabilizer composition of the present invention is useful for stabilizing a halogenated hydrocarbon against degradation, particularly against degradation induced by an acid. The halogenated hydrocarbon preferably contains one or more bromo and/or chloro atoms. The halogenated hydrocarbon preferably contains from 1 to 3 carbon atoms. The halogenated hydrocarbon can be a haloalkane, haloalkene or haloalkine, of which haloalkanes and haloalkenes are preferred, particularly those containing from 1 to 3 carbon atoms. The hydrocarbon may be fully or partially halogenated. Exemplary of haloalkanes and haloalkenes containing from 1 to 3 carbon atoms are n-propyl bromide, isopropyl bromide, bromomethane, chloromethane, methylene chloride, chloroform, trichloroethylene or perchloroethylene. The stabilizer composition is preferably used for stabilizing trichloroethylene or, most preferably, perchloroethylene.

The components of the stabilizer composition of the present invention can be added individually, as a mixture or as an above-described concentrate in an effective amount to the halogenated hydrocarbon. When the above-described concentrate is added to the halogenated hydrocarbon, an effective amount of concentrate is generally from 50 to 2000 ppm, preferably from 100 to 1200 ppm, more preferably from 300 to 900 ppm, based on the weight of the halogenated hydrocarbon.

Preferably, one or more epoxides are also added to the halogenated hydrocarbon. Epoxides which are useful for stabilizing halogenated hydrocarbons are known in the art. Preferred epoxides are epoxypropanol, mono- or diepoxycyclooctane, cyclopentene oxide, tert.-butyl glycidyl ether or isopropyl glycidyl ether. The most preferred epoxides are cyclohexene oxide or an optionally substituted cyclohexene oxide, such as 4-vinyl cyclohexene oxide. The epoxide(s) can be added to the halogenated hydrocarbon(s) individually or as a concentrate in an organic solvent, such as a hydrocarbon or a chlorinated hydrocarbon mentioned above. Such concentrate preferably contains from 10 to 90 percent, more preferably from 20 to 80 percent, most preferably from 40 to 65 percent of one or more epoxides, based on the total weight of the concentrate. The concentrate containing one or more epoxides optionally contains a stabilizer, such as an ether listed above. Generally it is not advisable to include the epoxide(s) in a concentrate which contains the N-alkyl morpholine a) and the amine b) because amines and epoxides are often not compatible in high concentrations.

The stabilized halogenated hydrocarbon preferably comprises from 5 to 500 ppm, more preferably from 20 to 150 ppm, most preferably from 30 to 100 ppm of one or more N-alkyl morpholines a), preferably from 1 to 100 ppm, more preferably from 5 to 50 ppm, most preferably from 10 to 30 ppm of one or more amines b), optionally from 100 to 10,000 ppm, preferably from 500 to 6,000 ppm, most preferably from 1,000 to 4,000 ppm of one or more epoxides, optionally from 2 to 500 ppm, preferably from 5 to 100 ppm, most preferably from 10 to 50 ppm of one or more antioxidants, and optionally from 2 to 500 ppm, preferably from 5 to 100 ppm, most preferably from 10 to 50 ppm of one or more ethers, based on the weight of the halogenated hydrocarbon.

The invention is illustrated by the following examples which should not be construed to limit the scope of the present invention. Unless stated otherwise all parts and percentages are given by weight.

EXAMPLE 1

A stabilized perchloroethylene was prepared which contained the following components:

75 ppm of N-methyl morpholine, 15 ppm of N,N,N',N',N"-pentamethyldiethylene triamine, 25 ppm of 2,4-di-tert.-butylphenol, and 2600 ppm of cyclohexene oxide.

The thus stabilized perchloroethylene had a high stability against decrease in alkalinity.

EXAMPLES 2–4 AND COMPARATIVE EXAMPLES A AND B 50 ppm of N-methyl morpholine, 2500 ppm of cyclohexene oxide and 25 ppm of di-tert-.butyl phenol were added to perchloroethylene. An additional amine was optionally added, as listed in Table I below.

TABLE I

| (Comparative) Example | Additional amine |
| --- | --- |
| A | none |
| B | 15 ppm of triethylamine |
| 2 | 15 ppm of 4-aminomethyl-1,8-octane diamine |
| 3 | 15 ppm of 1,4-diazabicyclo-[2.2.2]octane |
| 4 | 15 ppm of N,N,N',N',N"-pentamethyldiethylene triamine |

The stabilized perchloroethylene was used for degreasing metals in a cleaning apparatus. Contaminated perchloroethylene was distilled and subjected to recycling within the cleaning apparatus. The steps of degreasing metals, distillation and recycling of perchloroethylene were carried out continuously. Samples were taken from the condensed vapor, and the amine content in the perchloroethylene vapor phase in each sample was determined and expressed as alkalinity in ppm NaOH according to ASTM D-2942. The alkalinity in the condensed vapor was an indication of the stabilization level of the perchloroethylene in the cleaning apparatus. The distillation sump contained a mixture of 20 percent of various oils used in the metal working industry and 80 percent of stabilized perchloroethylene. The results are illustrated in FIG. 1 wherein the alkalinity of the condensed perchloroethylene vapor was plotted versus the reflux time in days.

FIG. 1 illustrates that perchloroethylene stabilized according to the present invention had considerably less decrease in alkalinity, and accordingly had a higher stabilizer capacity, than perchloroethylene which was stabilized according to the prior art.

COMPARATIVE EXAMPLES 5a TO 5g AND COMPARATIVE EXAMPLES Ca TO Cg AND Da TO Dg

In order to evaluate the stabilizer capacity over time of various amine combinations in perchloroethylene, 21 different combinations of two amines were added to perchloroethylene samples. In (Comparative) Examples 5a to 5g, 50 ppm of N-methyl morpholine were added to each perchloroethylene sample. In Comparative Examples Ca to Cg 50 ppm of diisopropylamine were added to each perchloroethylene sample. In Comparative Examples Da to Dg 50 ppm of N-methyl pyrrole were added to each perchloroethylene sample. Additionally, 20 ppm of a saturated straight-chain or cyclic amine listed in Table II below were added to each sample.

The stabilized perchloroethylene was used for degreasing metals in a cleaning apparatus as described in Examples 2 through 4. Contaminated perchloroethylene was distilled and subjected to recycling within the cleaning apparatus. As in Examples 2 through 4, samples were taken from the condensed vapor, and the amine content in the perchloroethylene vapor phase in each sample was determined and expressed as alkalinity in ppm NaOH according to ASTM D-2942. Samples were repeatedly taken over time. Table II below indicates the number of days at which the alkalinity in the perchloroethylene vapor phase reached 0 ppm.

TABLE II

| Amine (20 ppm) | (Comp.) Ex. 5a–5g | Comp. Ex. Ca–Cg | Comp. Ex. Da–Dg |
| --- | --- | --- | --- |
| N,N,N',N',N"-pentamethyl-diethylene triamine | >12 | 6 | 4 |
| 4-aminomethyl-1,8-octane diamine | >12 | 10 | 3 |
| 1,4-diazabicyclo-[2.2.2]octane | >12 | 7 | 5 |
| 1,3,5-triethylhexahydro-1,3,5-triazine | >12 | 10 | 5 |
| ethylene diamine | >12* | 10 | 5 |
| tetraethylene pentamine | 11 | 6 | 5 |
| 1,3-diamino propane | >12* | 10 | 4 |

*not part of the invention, but not prior art.

Table II illustrates that the combination of N-methyl morpholine with straight-chain or cyclic aliphatic amines containing no heteroatoms other than N with a boiling point of at least 150° C. was a considerably better stabilizer for halogenated hydrocarbons, such as perchloroethylene, than the combination of diisopropylamine or N-methyl pyrrole with the same straight-chain or cyclic aliphatic amines.

What is claimed is:

1. A method of stabilizing a halogenated hydrocarbon against degradation which method comprises incorporating in the halogenated hydrocarbon an effective amount of
   a) an N-alkyl morpholine and
   b) a straight-chain or cyclic aliphatic amine containing no heteroatoms other than N with a boiling point of at least 150° C.

2. The method according to claim 1 wherein the amines a) and b) and optional stabilizer components are dissolved as a concentrate in an organic solvent.

3. A stabilized halogenated hydrocarbon comprising a) an N-alkyl morpholine and b) a straight-chain or cyclic aliphatic amine containing no heteroatoms other than N with a boiling point of at least 150° C. in amounts sufficient to stabilize the halogenated hydrocarbon.

4. The stabilized halogenated hydrocarbon of claim 3 comprising
   a) from 5 to 500 ppm of one or more N-alkyl morpholines; and
   b) from 1 to 100 ppm of one or more straight-chain or cyclic aliphatic amines containing no heteroatoms other than N with a boiling point of at least 150° C., based on the weight of the halogenated hydrocarbon.

5. The stabilized halogenated hydrocarbon of claim 3 wherein the halogenated hydrocarbon contains from 1 to 3 carbon atoms.

6. The stabilized halogenated hydrocarbon of claim 5 wherein the halogenated hydrocarbon is perchloroethylene.

7. The stabilized halogenated hydrocarbon of claim 6 comprising from 30 to 100 ppm of N-methyl morpholine and from 10 to 30 ppm of N,N,N',N',N"-pentamethyldiethylene-triamine, based on the total weight of the halogenated hydrocarbon.

8. The stabilized halogenated hydrocarbon of claim 6 comprising
   a) from 5 to 500 ppm of one or more N-alkyl morpholines; and
   b) from 1 to 100 ppm of one or more straight-chain or cyclic aliphatic amines containing no heteroatoms other than N with a boiling point of at least 150° C., based on the weight of the halogenated hydrocarbon.

9. The stabilized halogenated hydrocarbon of claim 8 wherein wherein the amine b) is 1-aminoheptane, n-octyl amine, tert.-octyl amine, tetramethylene diamine, hexamethylene diamine, 1,8-octane diamine, 4-aminomethyl-1,8-octane diamine, hexamethylene tetraamine, 1,4-diazabicyclo[2.2.2]octane, 1,3,5-triethylhexahydro-1,3,5-triazine or N,N,N',N',N"-pentamethyldiethylene-triamine.

10. A stabilizer composition comprising
    a) an N-alkyl morpholine and
    b) a straight-chain or cyclic aliphatic amine containing no heteroatoms other than N with a boiling point of at least 150° C.

11. The stabilizer composition of claim 10 comprising from 20 to 99 percent of an amine a) and from 1 to 80 percent of an amine b), based on the total weight of a) and b).

12. The stabilizer composition of claim 10 wherein the amines a) and b) and optional stabilizer components are dissolved as a concentrate in an organic solvent.

13. The stabilizer composition of claim 10 comprising from 60 to 90 percent of an amine a) and from 10 to 40 percent of an amine b), based on the total weight of a) and b).

14. The stabilizer composition of claim 10 comprising from 60 to 90 percent of N-methyl morpholine and from 10 to 40 percent of N,N,N',N',N"-pentamethyldiethylene-triamine, based on the total weight of a) and b).

15. The stabilizer composition of claim 10 wherein the amine b) contains two or more amino groups.

16. The stabilizer composition of claim 10 wherein the amine b) has a boiling point of at least 180° C.

17. The stabilizer composition of claim 16 wherein the amine b) contains two or more amino groups.

18. The stabilizer composition of claim 10 wherein the amine b) is 1-aminoheptane, n-octyl amine, tert.-octyl amine, tetramethylene diamine, hexamethylene diamine, 1,8-octane diamine, 4-aminomethyl-1,8-octane diamine, hexamethylene tetraamine, 1,4-diazabicyclo[2.2.2]octane, 1,3,5-triethylhexahydro-1,3,5-triazine or N,N,N',N',N"-pentamethyldiethylene-triamine.

19. The stabilizer composition of claim 18 comprising from 20 to 99 percent of an amine a) and from 1 to 80 percent of an amine b), based on the total weight of a) and b).

20. The stabilizer composition of claim 18 comprising from 60 to 90 percent of an amine a) and from 10 to 40 percent of an amine b), based on the total weight of a) and b).

* * * * *